May 28, 1940.  F. G. RIESEN, SR  2,202,399
CONVEYER
Filed Feb. 27, 1939   2 Sheets-Sheet 1
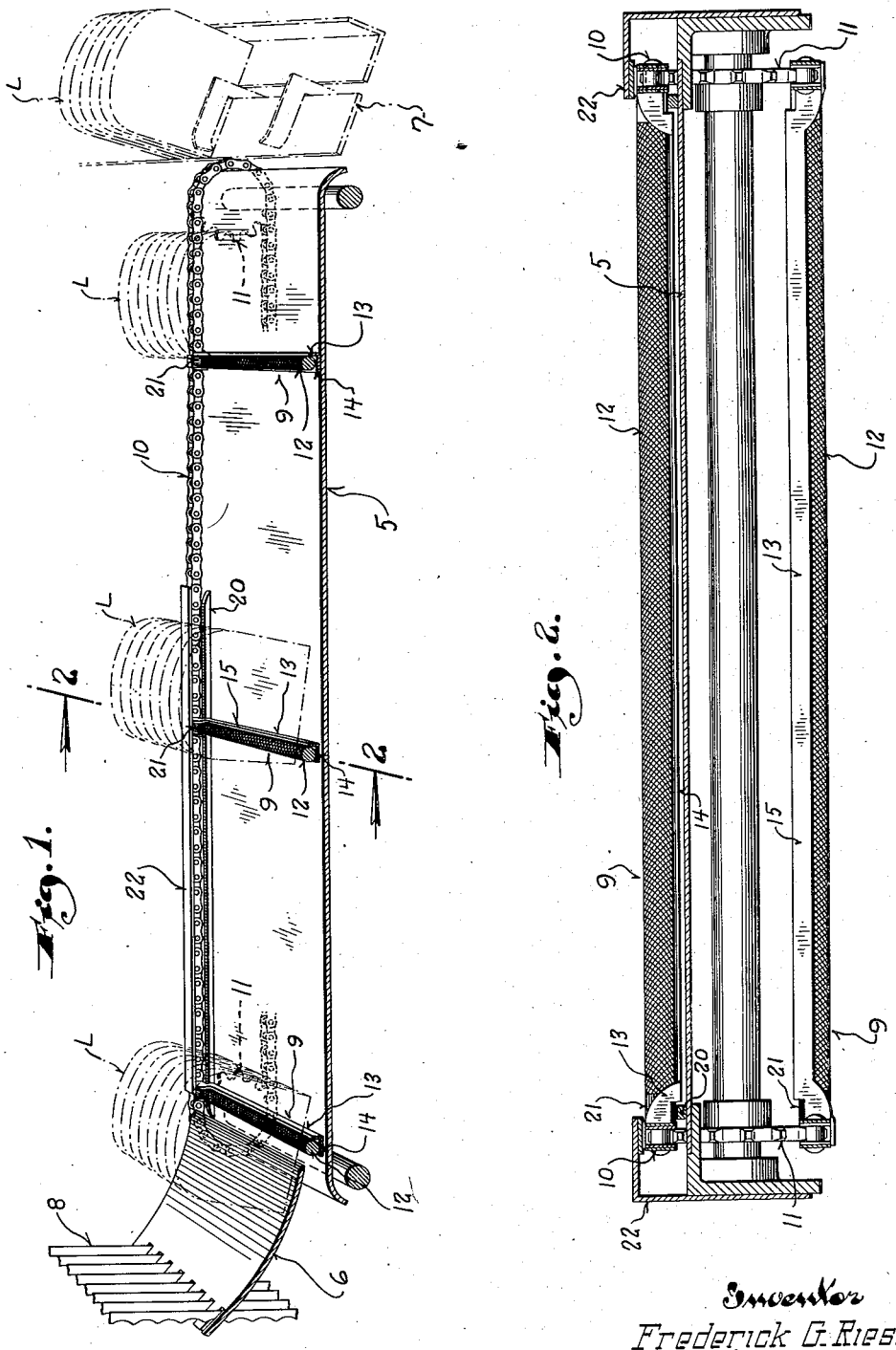
Inventor
Frederick G. Riesen Sr.
Attorney

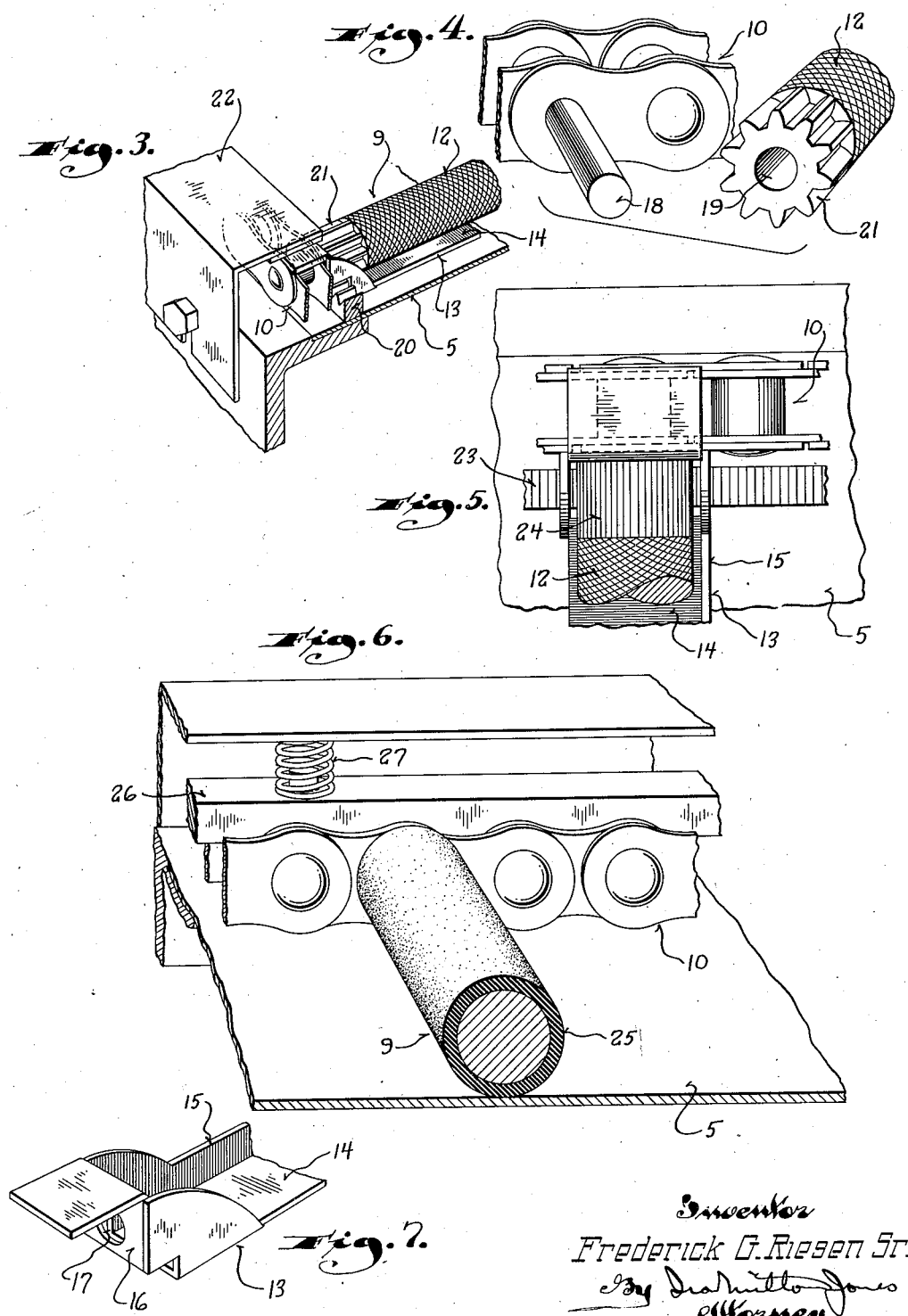

Patented May 28, 1940

2,202,399

UNITED STATES PATENT OFFICE 2,202,399

CONVEYER

Frederick G. Riesen, Sr., Milwaukee, Wis.

Application February 27, 1939, Serial No. 258,767

11 Claims. (Cl. 198—168)

This invention relates to conveyers, and refers particularly to endless conveyers of the type used with bread slicing machines for conveying sliced loaves from the slicing machine to a wrapper.

Where an endless conveyer is equipped with flights, and these flights are timed with another mechanism, as is the case in the transfer of sliced loaves from a bread slicing machine to a bread wrapping machine, it is of course highly undesirable to have the articles being conveyed "ride" the flights as this would interfere with the proper timing.

This invention, therefore, has as its primary object to provide means whereby an article "riding" a flight is dislodged and properly positioned in front of a flight.

More specifically it is an object of this invention to provide an endless conveyer of the type employing flights, with means to so actuate a portion of the flight that any article resting thereon will be dislodged and properly positioned in front of the flight.

Another object of this invention is to utilize the forward motion of the flights as the means for producing their dislodging motion.

Another object of this invention is to provide a conveyer of the character described in which the flights include a revoluble bar which constitutes the uppermost portion of the flights so that any article resting thereon will be dislodged through revolution of the bar.

Another object of this invention is to provide simple and effective means for revolving the bar as the flight is advanced along its defined path.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate several complete examples of the physical embodiment of the invention constructed in accordance with the best modes so far devised for the practical application of the principles thereof, and in which:

Figure 1 is a longitudinal sectional view through a conveyer constructed in accordance with this invention, and illustrating its application to a bread slicing machine to transfer the sliced loaves from the slicer to a wrapping machine;

Figure 2 is an enlarged cross sectional view taken through Figure 1 on the plane of the line 2—2;

Figure 3 is a detail perspective view illustrating the manner in which the revoluble bars of the flights are revolved;

Figure 4 is a detail perspective view showing one end of the revoluble flight bar and a section of the chain, to illustrate the manner in which the flight bar is attached;

Figure 5 is a top view showing one end of the flight bar and its associated mechanism, to illustrate a slightly modified embodiment of the invention;

Figure 6 is a perspective view illustrating another manner of effecting revolution of the flight bar; and Figure 7 is a detail perspective view showing one end of the pusher bar which constitutes part of the flight bar unit.

Referring now particularly to the accompanying drawings in which like numerals indicate like parts, the numeral 5 designates a substantially horizontal table or support on which the articles to be conveyed rest. In the present instance, this table extends from the discharge end of a chute 6 to the receiving conveyer 7 of a bread wrapping machine (not shown). The sliced loaves L after passing through the knives 8 of the bread slicing machine slide down the chute 6 onto the table 5.

The discharge end of the chute is spaced from the adjacent surface of the table 5 a distance just sufficient to allow the flights 9 of an endless conveyer to pass therebetween.

The endless conveyer comprises the flights 9 and a pair of sprocket chains 10 trained about sprockets 11 mounted near the ends of the table or support 5. Where the conveyer is being used to transfer sliced loaves from a bread slicing machine to a bread wrapping machine, the sprocket chains are driven from the bread wrapping machine to properly time the advance of the flights with the motion of the receiving pockets of the receiving conveyer of the bread wrapping machine.

Ordinarily, the descent of the sliced loaves down the discharge chute and their arrival at the table 5 is so timed with the approach of the flights 9 that the loaves are properly located ahead of the flights, but very often, a loaf will descend in such a manner that it rides the adjacent flight, and unless it is dislodged and properly positioned in advance of the flight, the arrival of this loaf at the receiving conveyer of the wrapping machine will be late.

To overcome this objection, the present invention provides a simple manner of dislodging a loaf resting on the flight and properly positioning it in advance of the flight. To this end, each flight comprises a revoluble rod 12 and a pusher bar 13, the revoluble rod 12 forming the uppermost portion of the flight so that any object resting thereon is dislodged through the revolution of the rod.

The pusher bars 13 are angular in cross section with a rather wide horizontal flange 14 and a narrow vertical flange 15. At the ends of these pusher bars, there are end walls 16 having a reinforced junction with the bar proper and having holes 17 for the reception of pins 18 carried by the sprocket chains.

In assembling the flights with the chains, the revoluble rods 12 are properly positioned with respect to their pusher bars, and the pins 18 of the chains are passed through the holes 17 and inserted into holes 19 in the ends of the revoluble rods. This is easily done by flexing the chain laterally.

Joined to the chains in this manner, the flights ride over the supporting table 5 with the horizontal flanges 14 of their pusher bars just clearing the surface of the table, and with the uppermost portion of the flights formed by the rounded top of the revoluble rods 12.

Any suitable means may be employed to revolve the rods as the flights are advanced over the supporting table. One way of effecting this action is through the provision of a rack 20 fixed to the supporting table adjacent to the upper stretch of one of the chains and with which pinions 21 on the adjacent ends of the revoluble rods mesh. In this manner, as the flights move forwardly over the supporting table 5, their revoluble rods revolve in a direction to dislodge any object resting thereon and push the same forwardly in front of their pusher bars 13. It is preferable to have the surface of the revoluble rods roughened in some manner as by the knurling shown.

Although the weight of the flights and the upper stretches of the chains is sufficient to ordinarily maintain the pinions in proper mesh with the rack bar, it is preferable to provide guards 22 which hold the chains down and positively maintain the pinions in mesh with the rack.

As a variation of the rack and pinion for revolving the flight rods, a construction such as illustrated in Figure 5 may be employed wherein a stationary bar 23, which takes the place of the rack bar, and the adjacent end 24 of the revoluble flight rod are merely serrated. In all other respects, the embodiment illustrated in Figure 5 is like that previously described.

Still another manner of effecting the desired revolution of the flight rods is illustrated in Figure 6. In this instance, the flight rods have either their entire cylindrical surface or a portion thereof covered with a sleeve 25 of rubber, or some other suitable material having a high coefficient of friction. This sleeve directly engages the surface of the supporting table 5, and through frictional contact causes the rod to roll. In this instance, the adjacent chain is preferably urged downwardly by means of a track 26 pressed down by coil springs 27.

From the foregoing description taken in connection with the accompanying drawings, it will be readily apparent that this invention provides an effective and exceedingly simple manner of dislodging articles resting on the flight bars of a flight equipped endless conveyer, and that the invention is particularly adapted to conveyors used for transferring sliced loaves of bread from a slicing machine to a wrapping machine.

What I claim as my invention is:

1. An endless conveyer of the type having flights movable along a defined path to advance articles along said path, characterized by the fact that the flights of the conveyer have: a pusher portion and a movable portion, said movable portion being frictionally engageable with an article resting thereon to dislodge the same from its position on the flight and move the same to a proper position in front of the pusher portion of the flight.

2. In an endless conveyer of the character described: flights movable along a defined path to advance articles along said path, each of said flights having a pusher portion engageable with an article in said path to advance the same along the conveyer, and a movable portion behind the pusher portion and projecting thereabove so that an article resting on the flight is in contact therewith; and means for moving said movable portion of the flight in a direction to dislodge an article resting thereon so that the article may be engaged by the pusher portion of the flights.

3. A conveyer for transferring sliced loaves of bread from a slicing machine to a wrapper, comprising: a support over which the sliced loaves move; an endless conveyer having flights movable across the support to push the sliced loaves along the support, said flights including, pusher bars engageable with the rear of the loaves; rotatable bars behind and above the pusher bars and exposed at their upper surfaces so that through rotation thereof any sliced loaf resting thereon will be dislodged; and means for revolving said bars as the flights move over said support.

4. In a conveyer of the character described: a flight movable along a defined path to advance an article along said path, said flight having a nonrotatable pusher bar, and a revoluble portion which is uppermost so that an article resting thereon will be dislodged by revolution of said portion; and means for revolving the revoluble portion of the flight as it advances along said defined path.

5. An endless conveyer having flights movable along a defined path, each of said flights including: a pusher, and a revoluble member above and behind the pusher so that an article resting thereon will be dislodged by revolution of said revoluble member; and means for positively revolving said member, said means including, a stationary member, and means on the revoluble member engaging the stationary member with a contact causing the revoluble member to roll.

6. An endless conveyer having flights movable along a defined path, each of said flights including: a nonrotatable pusher member, and a revoluble member behind the pusher member constituting the upper portion of the flight so that an article resting thereon will be dislodged by revolution of said revoluble member; and means for positively revolving said member, said means comprising, a stationary rack and pinions carried by said revoluble members of the flights and meshing with said rack.

7. An endless conveyer having flights movable along a defined path, each of said flights including: a nonrotatable pusher, and a revoluble member adjacent to the leading edge of said pusher which constitutes the upper portion of the flight so that an article resting thereon will be dislodged by revolution of said member; and means for positively revolving said member, said means comprising, serrations at the ends of the revoluble members, and a stationary part frictionally engageable with said serrations to cause said revoluble members to roll as the flights move along said path.

8. In a conveyer of the character described: an endless element and a flight carried by said endless element for movement along a defined path, said flight comprising: a pusher bar; and a rotating rod, the rotating rod constituting the uppermost portion of the flight, whereby articles resting on the flight are dislodged therefrom and positioned for engagement by the pusher member.

9. In an endless conveyer of the character described: a flight movable along a fixed path, said flight comprising, a substantially angle shaped pusher bar having a horizontal flange and a vertical flange; and a revoluble rod mounted above the bar with its upper surface forming the uppermost portion of the flight.

10. In a conveyer of the character described: a chain; a flight attached thereto to be advanced by the chain, said flight being provided with a pusher bar and a revoluble member; a stationary part near the chain; a part on the revoluble member engaging said stationary part to cause said member to revolve as the flight is advanced by the chain as long as the chain remains in its proper position; and a guard engaging over the chain to hold the same against displacement.

11. In a conveyer for conveying soft deformable articles such as freshly baked bread and the like: a support over which the loaves are to be moved; a plurality of flights movable successively along said support to convey the loaves thereover, each of said flights comprising a pusher engageable with the loaf and having a portion closely adjacent to said support to preclude wedging of the bread between it and the pusher bar; and a revoluble portion above and behind said pusher so that an article resting on the flight is dislodged by revolution of said portion and disposed on the support in position to be engaged by a pusher; and means for revolving said portion as the flight advances along the support.

FRED'K G. RIESEN, Sr.